US009323461B2

(12) United States Patent
Kawaguchi

(10) Patent No.: US 9,323,461 B2
(45) Date of Patent: Apr. 26, 2016

(54) TRAFFIC REDUCING ON DATA MIGRATION

(75) Inventor: Tomohiro Kawaguchi, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 870 days.

(21) Appl. No.: 13/461,150

(22) Filed: May 1, 2012

(65) Prior Publication Data

US 2013/0297899 A1 Nov. 7, 2013

(51) Int. Cl.
*G06F 12/02* (2006.01)
*G06F 3/06* (2006.01)
*G06F 11/20* (2006.01)

(52) U.S. Cl.
CPC .............. *G06F 3/0613* (2013.01); *G06F 3/065* (2013.01); *G06F 3/067* (2013.01); *G06F 11/2069* (2013.01)

(58) Field of Classification Search
CPC .................................................. G06F 11/1448
USPC ........................................................ 711/162
See application file for complete search history.

(56) References Cited

U.S. PATENT DOCUMENTS 7,152,078 B2 * 12/2006 Yamagami
7,165,155 B1 * 1/2007 Duprey et al. ................ 711/162
7,991,860 B2 8/2011 Otani
2003/0033494 A1 2/2003 Fujibayashi et al.
2005/0223170 A1 10/2005 Ushijima et al.
2006/0085607 A1 4/2006 Haruma
2006/0236048 A1 10/2006 Deguchi et al.
2007/0050578 A1 3/2007 Fujibayashi
2009/0193206 A1 7/2009 Ishii et al.
2011/0099345 A1 * 4/2011 Mitsui .......................... 711/162

OTHER PUBLICATIONS

Japanese Office Action received in corresponding Japanese Application No. 2012-248035 dated Nov. 24, 2015.

* cited by examiner

*Primary Examiner* — Charles Rones
*Assistant Examiner* — Ryan Dare
(74) *Attorney, Agent, or Firm* — Mattingly & Malur, PC

(57) ABSTRACT

Exemplary embodiments provide a technique to reduce the traffic between storage devices during data migration. In one embodiment, a system comprises a plurality of storage systems which are operable to migrate a set of primary and secondary volumes between the storage systems by managing and copying, between the storage systems, a plurality of same data and a plurality of difference data between the primary and secondary volumes and location information of each of the plurality of difference data, the location information identifying a location of the difference data in the primary or secondary volume associated with the difference data. Each secondary volume which corresponds to a primary volume, if said each source secondary volume contains data, has a same data as the primary volume and, if said each secondary volume is not synchronized with the primary volume, further has a difference data with respect to the primary volume.

19 Claims, 17 Drawing Sheets

| Pair# (121-1) | Status (121-2) | PVOL (121-3) | SVOL (121-4) |
|---|---|---|---|
| 0 | PAIR | 0 | 4 |
| 1 | PAIR | 1 | 5 |
| 2 | PSUS | 2 | 6 |
| 3 | PSUS | 3 | 7 |
| 4 | PSUS | 15 | 75 |
| 5 | PAIR | 35 | 34 |
| 6 | COPY | 67 | 43 |
| 7 | SMPL | none | none |
| 8 | SMPL | none | none |
| 9 | SMPL | none | none |
| 10 | SMPL | none | none |

| Address (122-1) | Delta (122-2) |
|---|---|
| 0 | Yes |
| 1 | No |
| 2 | No |
| 3 | Yes |
| 4 | No |
| 5 | Yes |
| 6 | Yes |
| 7 | No |
| 8 | No |
| 9 | No |
| 10 | Yes |

| Address | Delta |
|---|---|
| 0 | No |
| 1 | No |
| 2 | Yes |
| 3 | No |
| 4 | No |
| 5 | No |
| 6 | No |
| 7 | No |
| 8 | Yes |
| 9 | Yes |
| 10 | Yes |

| 141-1 Pair# | 141-2 Status | 141-3 PVOL | 141-4 SVOL |
|---|---|---|---|
| 0 | PAIR | 0 | 4 |
| 1 | PAIR | 1 | 5 |
| 2 | PSUS | 2 | 6 |
| 3 | PSUS | 3 | 7 |
| 4 | PSUS | 15 | 75 |
| 5 | PAIR | 35 | 34 |
| 6 | COPY | 67 | 43 |
| 7 | SMPL | none | none |
| 8 | SMPL | none | none |
| 9 | SMPL | none | none |
| 10 | SMPL | none | none |

| 142-1 Address of PVol | 142-2 Delta |
|---|---|
| 0 | Yes |
| 1 | No |
| 2 | No |
| 3 | No |
| 4 | No |
| 5 | No |
| 6 | Yes |
| 7 | No |
| 8 | No |
| 9 | No |
| 10 | Yes |

| Address of SVol (143-1) | Delta (143-2) | Stored Address (143-3) |
|---|---|---|
| 0 | Yes | 589 |
| 1 | No | none |
| 2 | No | none |
| 3 | Yes | 3656 |
| 4 | No | none |
| 5 | Yes | 682 |
| 6 | Yes | 874 |
| 7 | No | none |
| 8 | No | none |
| 9 | No | none |
| 10 | Yes | 471 |

| Address (144-1) | Allocation (144-2) | Shared (144-3) |
|---|---|---|
| 0 | Yes | Yes |
| 1 | Yes | No |
| 2 | Yes | Yes |
| 3 | Yes | No |
| 4 | Yes | Yes |
| 5 | Yes | Yes |
| 6 | Yes | Yes |
| 7 | Yes | No |
| 8 | Yes | No |
| 9 | No | No |
| 10 | No | No |

TRAFFIC REDUCING ON DATA MIGRATION

BACKGROUND OF THE INVENTION

The present invention relates generally to storage systems and, more particularly, to methods and apparatus for reducing traffic on data migration.

Non-disruptive volume and path migration technology is known. See, e.g., U.S. Pat. No. 7,991,860. The technology is for a simplex (non-function-applied) volume, but it can be easily extended to function applied volume such as, for instance, local copy applied volume. The method involves migrating all volumes which establish a pair or consistency group simultaneously, establishing a pair or a group using migration target volumes with the same configuration of migration source volumes, and succeeds the status and other information relating to the pair and group to the migration target.

Generally, a narrow connection between the migration source and the target storage devices makes the migration slow. It is difficult to install new switch devices to increase traffic performance because it increases cost.

BRIEF SUMMARY OF THE INVENTION

Exemplary embodiments of the invention provide a technique to reduce the traffic between the storage devices during data migration. Generally the connection between storage devices is tighter/narrower than that the internal connection of a storage device. The narrower connection renders data migration slower. Embodiments of this invention make it possible to offload traffic load between storage devices to the internal connection of a storage device. According to one embodiment, a data migration method migrates all volumes which establish a pair or a consistency group simultaneously. It establishes a pair or a group using migration target volumes with the same configuration as migration source volumes. The storage device finds or makes deduplicated data before migration. The storage device transfers only the deduplicated data and difference data just once. After migration target storage device copies the data, it expands the deduplication if necessary (i.e., restores the original configuration and data storing status). The technique can reduce migration transfer load on local copy/snapshot used environment.

In accordance with an aspect of the present invention, a system comprises a plurality of storage systems which are operable to migrate a set of primary and secondary volumes between the plurality of storage systems by managing and copying, between the plurality of storage systems, a plurality of same data and a plurality of difference data between the primary and secondary volumes and location information of each of the plurality of difference data, the location information identifying a location of the difference data in the primary or secondary volume associated with the difference data. Each secondary volume which corresponds to a primary volume, if said each source secondary volume contains data, has a same data as the primary volume and, if said each secondary volume is not synchronized with the primary volume, further has a difference data with respect to the primary volume.

In some embodiments, the plurality of storage systems are operable to copy each same data of the plurality of same data from a source primary volume for said each same data to a corresponding target primary volume and a corresponding target secondary volume. The corresponding target primary volume and the corresponding target secondary volume are disposed in a target storage system. The plurality of storage systems are operable to copy each difference data of the plurality of difference data from a source secondary volume for said each difference data to a corresponding target secondary volume, if data in the corresponding target secondary volume has not been updated in the target storage system since the difference data is stored in the source secondary volume.

In specific embodiments, the plurality of storage systems are operable to copy each difference data of the plurality of difference data from a source secondary volume for said each difference data to a corresponding target secondary volume. The location information of each difference data of the plurality of difference data comprises a delta bitmap identifying the location of said each difference data in the primary or secondary volume associated with the difference data. A source primary volume has a plurality of corresponding source secondary volumes to establish multiple pairs for the same source primary volume, each pair of the multiple pairs having a delta bitmap identifying the location of any difference data for said each pair. Migrating the source primary volume and the plurality of corresponding source secondary volumes comprises copying same data and difference data for the source primary volume and the plurality of corresponding source secondary volumes, to a target primary volume and a plurality of corresponding target secondary volumes, based on the delta bitmap of each pair of the multiple pairs.

In some embodiments, for migration from a source primary volume and a corresponding source secondary volume which establish a pair of source volumes in a source storage system to a target primary volume and a corresponding target secondary volume which establish a pair of target volumes in a target storage system, the plurality of storage systems are operable to: manage local copy difference information between each primary volume and each corresponding secondary volume which establish a pair; manage migration progress between each source volume and each corresponding target volume using a migration progress management table which shows, for an address of one or both of the volumes of each pair, a migration progress delta which is initially set to YES and is changed to NO when a copy for migration from source to target is finished on the address; if the migration progress delta for the source primary volume is YES, copy data from the source primary volume to the target primary volume and change the migration progress delta of the address of the target primary volume to NO, and, if the local copy difference information indicates there is no difference data between the target primary volume and the target secondary volume, copy the data from the source primary volume to the target secondary volume and change the migration progress delta of the address of the target secondary volume to NO; and if the migration progress delta for the source secondary volume is YES, copy data from the source secondary volume to the target secondary volume and change the migration progress delta of the address of the target secondary volume to NO.

In specific embodiments, each storage system includes a pool for storing the difference data for the volumes in said each storage system, and the location information for each difference data identifies the location of said each difference data in the pool. The location information for each difference data is associated with a secondary volume which has said each difference data with respect to a corresponding primary volume. The plurality of storage systems are configured, for migration from a source primary volume and a corresponding source secondary volume which establish a pair of source volumes in a source storage system to a target primary volume and a corresponding target secondary volume which establish a pair of target volumes in a target storage system, to: manage local copy difference information between each primary volume and each corresponding secondary volume which establish a pair; and if the local copy difference information indicates there is difference data between the pair of source volumes, copy the difference data for the pair of source volumes from a pool in the source storage system to a pool in the target storage system using the location information associated with the source secondary volume of the pair of source volumes. A source primary volume has a plurality of corresponding source secondary volumes to establish multiple pairs for the same source primary volume, each corresponding source secondary volume being associated with the location information for any difference data with respect to the source primary volume. The plurality of storage systems are configured, after the difference data is copied from the pool in the source storage system to the pool in the target storage system, to associate the location information for the difference data in the pool in the target storage system with each corresponding target secondary volume in the target storage system.

Another aspect of the invention is directed to a first storage system in a system of a plurality of storage systems. The first storage system comprises a processor; a memory; and a migration control module. The migration control module is configured to migrate a set of source primary and secondary volumes from the first storage system to one or more target storage systems by managing and copying, between the first storage system and the one or more target storage systems, a plurality of same data and a plurality of difference data between the source primary and secondary volumes and location information of each of the plurality of difference data, the location information identifying a location of the difference data in the source primary or secondary volume associated with the difference data. Each source secondary volume which corresponds to a source primary volume, if said each source secondary volume contains data, has a same data as the source primary volume and, if said each source secondary volume is not synchronized with the source primary volume, further has a difference data with respect to the source primary volume.

In some embodiments, the migration control module is configured to copy each same data of the plurality of same data from a source primary volume for said each same data to a corresponding target primary volume and a corresponding target secondary volume in a target storage system. The migration control module is configured to copy each difference data of the plurality of difference data from a source secondary volume for said difference data to a corresponding target secondary volume in a target storage system.

In specific embodiments, the location information of each difference data of the plurality of difference data comprises a delta bitmap identifying the location of said each difference data in the source primary or secondary volume associated with the difference data. One source primary volume has a plurality of corresponding source secondary volumes to establish multiple pairs for the same source primary volume, each pair of the multiple pairs having a delta bitmap identifying the location of any difference data for said each pair. Migrating the source primary volume and the plurality of corresponding source secondary volumes comprises copying same data and difference data, for the source primary volume and the plurality of corresponding source secondary volumes, to a target primary volume and a plurality of corresponding target secondary volumes in a target storage subsystem, based on the delta bitmap of each pair of the multiple pairs.

In some embodiments, for migration from a source primary volume and a corresponding source secondary volume which establish a pair of source volumes in the first storage system to a target primary volume and a corresponding target secondary volume which establish a pair of target volumes in a target storage system, the first storage system further comprises a local copy control module configured to manage local copy difference information between each source primary volume and each corresponding source secondary volume which establish a pair. The migration control module is configured to: manage migration progress between each source volume and each corresponding target volume using a migration progress management table which shows, for an address of one or both of the source volumes of each pair, a migration progress delta which is initially set to YES and is changed to NO when a copy for migration from source to target is finished on the address; if the migration progress delta for the source primary volume is YES, copy data from the source primary volume to the target primary volume and change the migration progress delta of the address of the target primary volume to NO, and obtain from the target storage system local copy difference information between the target primary volume and the target secondary volume, and, if the obtained local copy difference information indicates there is no difference data between the target primary volume and the target secondary volume, copy the data from the source primary volume to the target secondary volume and change the migration progress delta of the address of the target secondary volume to NO; and if the migration progress delta for the source secondary volume is YES, copy data from the source secondary volume to the target secondary volume and change the migration progress delta of the address of the target secondary volume to NO.

In specific embodiments, each storage system includes a pool for storing the difference data for the volumes in said each storage system. The location information for each difference data identifies the location of said each difference data in the pool. The location information for each difference data is associated with a secondary volume which has said each difference data with respect to a corresponding primary volume. For migration from a source primary volume and a corresponding source secondary volume which establish a pair of source volumes in the first storage system to a target primary volume and a corresponding target secondary volume which establish a pair of target volumes in a target storage system, the first storage system further comprises a local copy control module configured to manage local copy difference information between each source primary volume and each corresponding source secondary volume which establish a pair. The migration control module is configured, if the local copy difference information indicates there is difference data between a pair of source volumes, copy the difference data for the pair of source volumes from a pool in the first storage system to a pool in a target storage system using the location information associated with the source secondary volume of the pair of source volumes.

Another aspect of this invention is directed to a second storage system in a system of a plurality of storage systems. The second storage system comprises a processor; a memory; and a migration control module. The migration control module is configured to migrate a set of source primary and secondary volumes from one or more source storage systems to the second storage system by managing and copying, between the one or more source storage systems to the second storage system, a plurality of same data and a plurality of difference data between the source primary and secondary volumes and location information of each of the plurality of difference data, the location information identifying a location of the difference data in the source primary or secondary volume associated with the difference data. Each source secondary volume which corresponds to a source primary volume, if said each source secondary volume contains data, has a same data as the source primary volume and, if said each source secondary volume is not synchronized with the source primary volume, further has a difference data with respect to the source primary volume.

In some embodiments, the migration control module is configured to copy each same data of the plurality of same data from a source primary volume for said each same data to a corresponding target primary volume and a corresponding target secondary volume in the second storage system. The migration control module is configured to copy each difference data of the plurality of difference data from a source secondary volume for said difference data to a corresponding target secondary volume in the second storage system.

In specific embodiments, the location information of each difference data of the plurality of difference data comprises a delta bitmap identifying the location of said each difference data in the source primary or secondary volume associated with the difference data. One source primary volume has a plurality of corresponding source secondary volumes to establish multiple pairs for the same source primary volume, each pair of the multiple pairs having a delta bitmap identifying the location of any difference data for said each pair. Migrating the source primary volume and the plurality of corresponding source secondary volumes comprises copying same data and difference data, for the source primary volume and the plurality of corresponding source secondary volumes, to a target primary volume and a plurality of corresponding target secondary volumes in the second storage subsystem, based on the delta bitmap of each pair of the multiple pairs.

In some embodiments, for migration from a source primary volume and a corresponding source secondary volume which establish a pair of source volumes in a source storage system to a target primary volume and a corresponding target secondary volume which establish a pair of target volumes in the second storage system, the second storage system further comprises a local copy control module configured to manage local copy difference information between each target primary volume and each corresponding target secondary volume which establish a pair. The migration control module is configured to: manage migration progress between each source volume and each corresponding target volume using a migration progress management table which shows, for an address of one or both of the source volumes of each pair, a migration progress delta which is initially set to YES and is changed to NO when a copy for migration from source to target is finished on the address; if the migration progress delta for the source primary volume is YES, copy data from the source primary volume to the target primary volume and change the migration progress delta of the address of the target primary volume to NO, wherein, if the local copy difference information indicates there is no difference data between the target primary volume and the target secondary volume, the local copy control module is configured to copy the data from the target primary volume to the target secondary volume and change the migration progress delta of the address of the target secondary volume to NO; and if the migration progress delta for the source secondary volume is YES, copy data from the source secondary volume to the target secondary volume and change the migration progress delta of the address of the target secondary volume to NO.

In specific embodiments, each storage system includes a pool for storing the difference data for the volumes in said each storage system. The location information for each difference data identifies the location of said each difference data in the pool. The location information for each difference data is associated with a secondary volume which has said each difference data with respect to a corresponding primary volume. For migration from a source primary volume and a corresponding source secondary volume which establish a pair of source volumes in a source storage system to a target primary volume and a corresponding target secondary volume which establish a pair of target volumes in the second storage system, the second storage system further comprises a local copy control module configured to manage local copy difference information between each target primary volume and each corresponding target secondary volume which establish a pair. The migration control module is configured to obtain from the source storage system local copy difference information between the source primary volume and the source secondary volume which establish the pair of source volumes, and, if the obtained local copy difference information indicates there is difference data between the pair of source volumes, copy the difference data for the pair of source volumes from a pool in the first storage system to a pool in a target storage system using the location information associated with the source secondary volume of the pair of source volumes.

These and other features and advantages of the present invention will become apparent to those of ordinary skill in the art in view of the following detailed description of the specific embodiments.

BRIEF DESCRIPTION OF THE DRAWINGS

FIG. 3 illustrates an example of a Local Copy Pair Management Table according to the first embodiment of the invention.

FIG. 4 illustrates an example of a Local Copy Delta Management Table according to the first embodiment of the invention.

FIG. 5 illustrates an example of a Migration Progress Management Table according to the first embodiment of the invention.

FIG. 13 illustrates an example of a Snapshot Pair Management Table according to the third embodiment of the invention.

FIG. 14 illustrates an example of a Snapshot Primary Volume Delta Management Table according to the third embodiment of the invention.

FIG. 15 illustrates an example of a Snapshot Secondary Volume Delta Management Table according to the third embodiment of the invention.

FIG. 16 illustrates an example of a Snapshot Pool Management Table 144 according to the third embodiment of the invention.

DETAILED DESCRIPTION OF THE INVENTION

Figure 1:
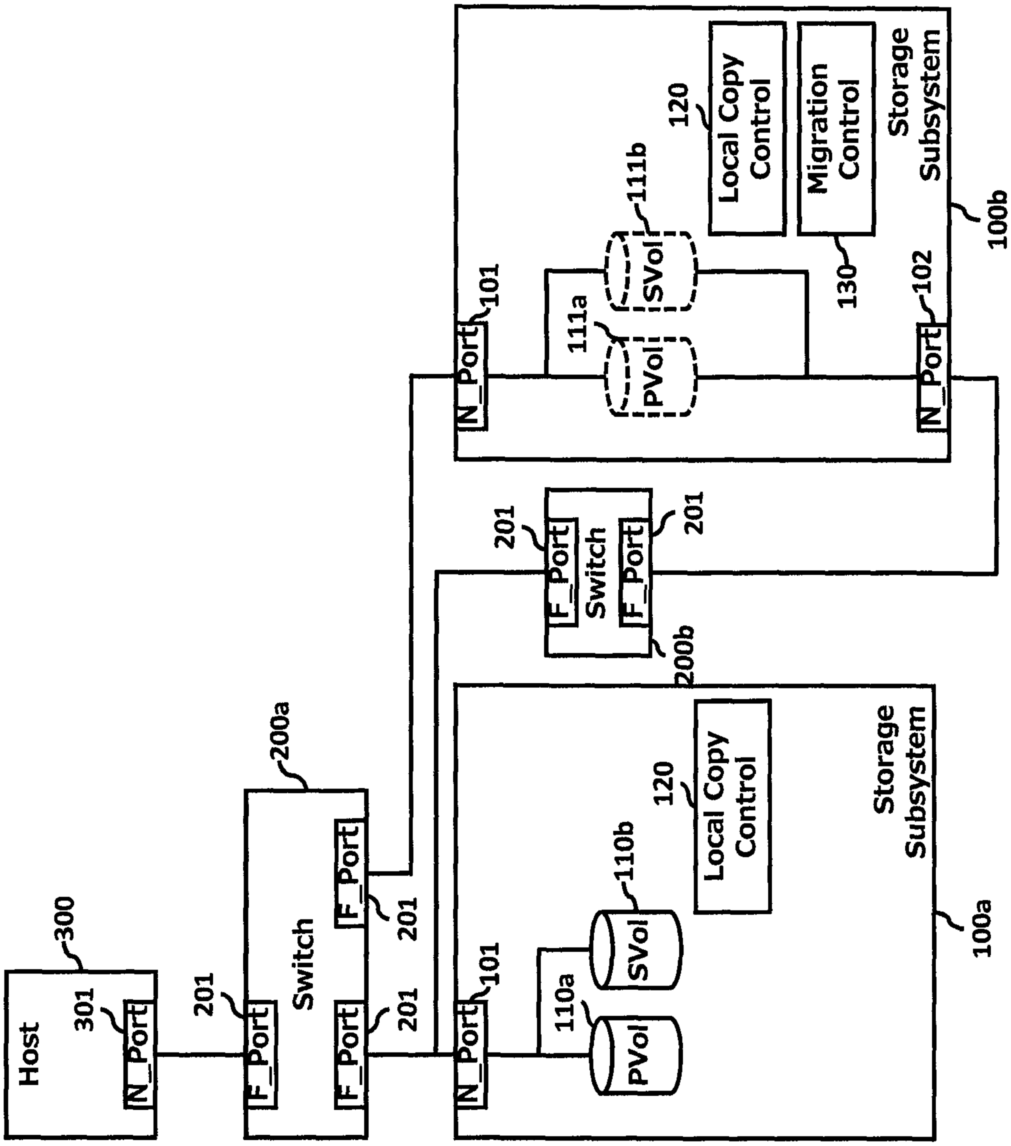
FIG. 1 illustrates an example of a physical and logical hardware configuration of a system in which the method and apparatus of the invention may be applied according to a first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for reducing traffic on data migration.

First Embodiment

FIG. 1 illustrates an example of a physical and logical hardware configuration of a system in which the method and apparatus of the invention may be applied according to a first embodiment of the invention. The system includes a host computer 300 coupled via switch 200*a* to storage subsystems 100*a*, 100*b*, which are connected via switch 200*b*. Each storage subsystem 100*a*, 100*b* is a type of computer system having processor(s), memory, ports, and disks. It receives an I/O from a host computer and another storage subsystem via port 101. It sends an I/O to another storage subsystem via port 102. Programs and tables to control the storage subsystem are stored in the memory and executed by the processor(s). Volumes 110*a* and 110*b* are controlled by the storage subsystem and the data is stored into the disks. The volumes 110*a*, 110*b* establish a local copy pair as a primary volume 110*a* and a secondary volume 110*b*. If a storage user orders to resynchronize the pair, the data of the primary volume 110*a* is copied to the secondary volume 110*b*. The management and control of the local copy pair is operated by a Local Copy Control 120 which is stored in the memory. The volumes 110*a*, 110*b* are migration source volumes to be migrated to volumes 111*a* and 111*b* as discussed further below. The volume 111*a* and

111*b* are migration target volumes to be migrated from the migration source volumes 110*a* and 110*b*. More specifically, the data of the source primary volume 110*a* is migrated to the target primary volume 111*a*, and the data of the source secondary volume 110*b* is migrated to the target secondary volume 111*b*. The management and control of the migration is operated by a Migration Control 130 which is stored in the memory. During the migration, if a migration target volume receives an I/O request, it transfers the I/O request to its migration source volume. After the migration, both data and I/O operation are migrated to the migration target volume.

The Local Copy Control 120 manages and controls local copy. It needs a pair established by two volumes in a storage subsystem. One volume is a primary volume the other volume is a secondary volume. Generally it copies data from the primary volume to the secondary volume. The start of the copy is ordered by a storage user.

The Migration Control 130 manages and controls volume migration. It needs a pair established by two volumes on different storage subsystems. One volume is a source volume the other volume is a target volume. It copies data and changes a path from the source volume to the target volume. The start of the migration is ordered by a storage user.

The host computer 300 is a type of computer system having processor(s), memory, and ports. It sends an I/O to the storage subsystem via port 301. The switches 200*a* and 200*b* have ports 201 which transfer I/O among the host port 301 and the storage subsystem ports 101, 102. In this embodiment, the switch 200*a* and 200*b* are independent devices, but they can be consolidated into a single device.

Figure 2:
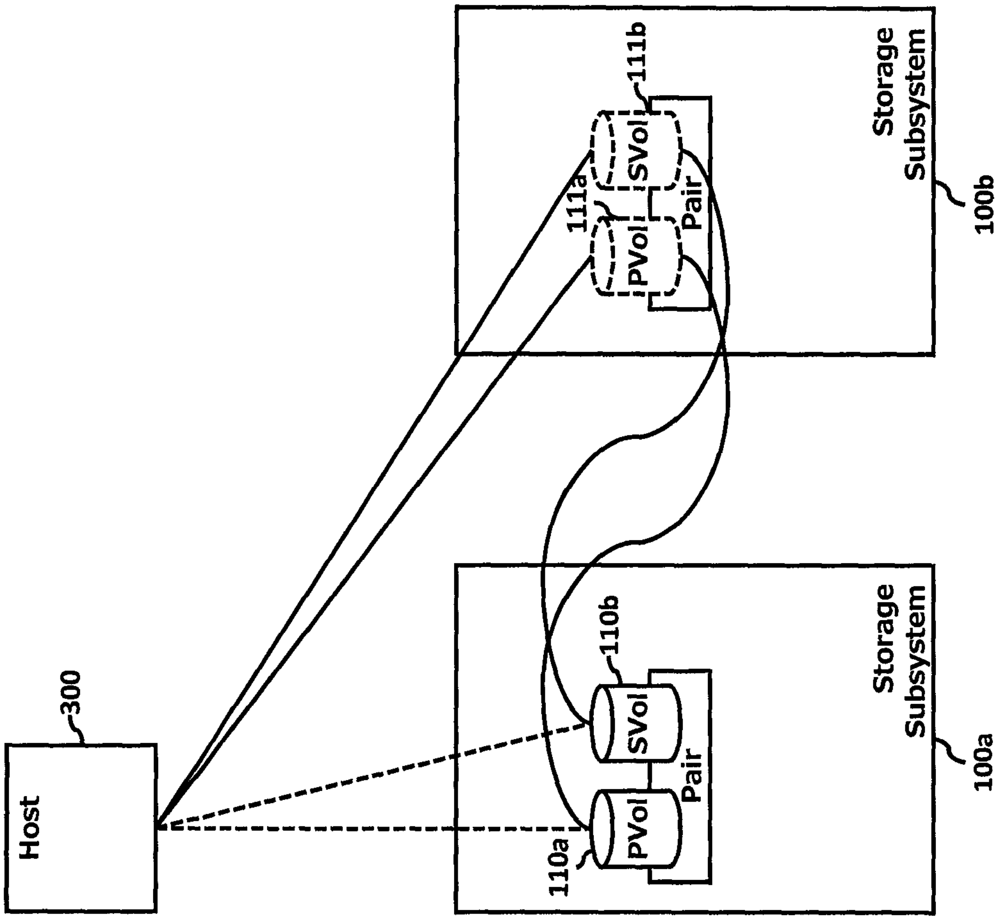
FIG. 2 illustrates an example of the logical hardware and local copy pair configuration of the system of FIG. 1 during migration according to the first embodiment of the invention.

FIG. 2 illustrates an example of the logical hardware and local copy pair configuration of the system of FIG. 1 during migration according to the first embodiment of the invention. The source volumes 110*a* and 110*b* establishes a local copy pair in the source storage subsystem 100*a*. Before the start of the migration, the source volume 110*a* and 110*b* establish a local copy pair. After the migration, it is expected that the pair configuration also is migrated to the target volumes. As such, the target storage subsystem 100*b* creates the target volumes 111*a* and 111*b*. The target storage subsystem 100*b* starts the migration, and changes the path between the host computer 300 and the source storage subsystem 100*a* to a path between the host computer 300 and the target storage subsystem 100*b*. The target storage subsystem 100*b* copies the pair status between the source volumes 110*a* and 110*b* and applies the pair status to the target volumes 111*a* and 111*b*.

FIG. 3 illustrates an example of a Local Copy Pair Management Table 121 according to the first embodiment of the invention. This table is used by and may be included in the Local Copy Control 120 to manage the pair configuration and status between volumes. The table is stored in the source storage subsystem 100*a* to be used for managing the pair of source volumes 110*a* and 110*b*. The table is stored in the target storage subsystem 100*b* to be used for managing the pair of target volume 111*a* and 111*b*. The table includes columns of Pair Number 121-1 containing an ID of a pair, Status 121-2 indicating the status of the pair, Primary Volume (PVOL) Number 121-3 containing an ID of the primary volume of the pair, and Secondary Volume (SVOL) Number 121-4 containing an ID of the secondary volume of the pair. For the Status column, the "PSUS" status means the primary and the secondary volumes are independent. During this status, the Local Copy Control 120 records a write accessed area of the primary volume and the secondary volume. The "COPY" and "PAIR" status each mean that the primary and the secondary volumes are synchronized. During this status, the Local Copy Control 120 copies data from the primary volume to the secondary volume which is located in the write accessed area and forbids access to the secondary volume. The "SMPL" status means the pair is not established yet.

FIG. 4 illustrates an example of a Local Copy Delta Management Table 122 according to the first embodiment of the invention. This table is used by and may be included in the Local Copy Control 120. Each pair listed in the Copy Pair Management Table 121 has this Local Copy Delta Management Table 122. It manages the difference between the primary volume and secondary volume which establish a pair. The table has columns of Address 122-1 and Delta Information 122-2. The Address 122-1 is the address of a primary volume or a secondary volume of the pair. For the Delta Information 122-2, the initial record (when the pair status changes to "PSUS" from other pair status) is "No" on all addresses. When a primary volume and/or a secondary volume receives a write I/O, the status changes to "Yes." When a copy from a primary volume to a secondary volume has been finished on the address on "COPY" or "PAIR" status, the record changes to "No."

One aspect of the invention is to manage the migration of each pair of primary volume and secondary volume which have same data and difference data in general (there will be no difference data if they are synchronized). Ideally, it is preferably, during migration of each pair of primary volume and secondary volume, to copy the same data to the target only once and, if there is any difference data, to copy the difference data to the target only once, thereby reducing migration transfer load. Embodiments of this invention enable the system to do so.

FIG. 5 illustrates an example of a Migration Progress Management Table 131 according to the first embodiment of the invention. This table is used by and may be included in the Migration Control 130. Each migration target volume has this table. The table has columns of Address 131-1 and Delta Information 131-2. The Address 131-1 is the address of a primary volume or a secondary volume of the pair. For the Delta Information 131-2, the initial record (when the migration starts) is "Yes" on all addresses. When a copy for migration has been finished on the address, the record changes to "No."

Figure 6:
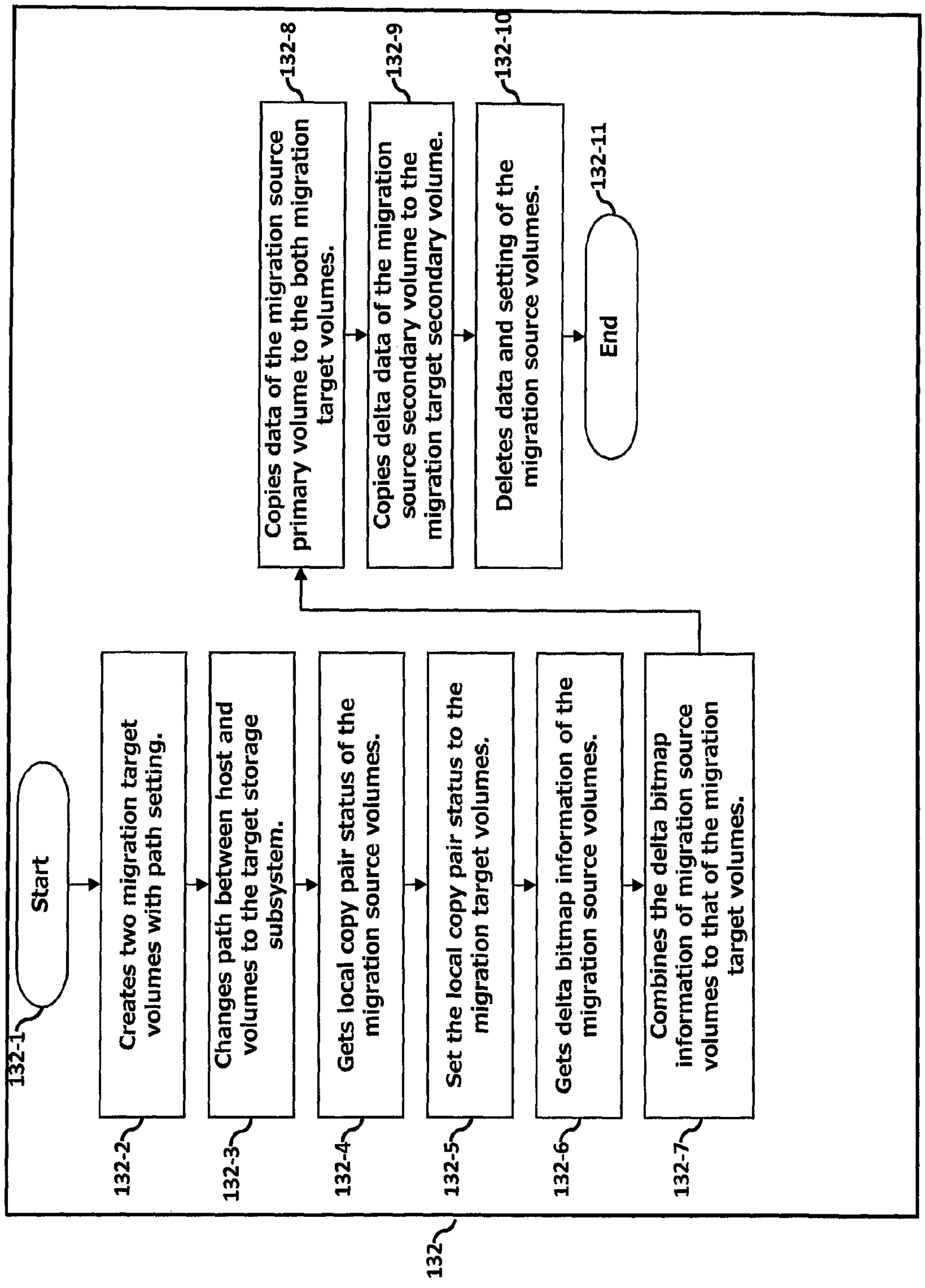
FIG. 6 is an example of a flow diagram illustrating the process of a Migration Progress Program according to the first embodiment of the invention.

FIG. 6 is an example of a flow diagram illustrating the process of a Migration Progress Program 132 according to the first embodiment of the invention. This program is included in the Migration Control 130. It copies data from a source volume to a target volume which establish a local copy pair. The program starts at step 132-1. It creates migration target volumes 111*a* and 111*b* with local copy pair establishment and sets the pair status to "PSUS" (132-2). In step 132-3, it changes the paths between the host computer 300 and the source volumes 110*a* and 110*b* to paths between the host computer 300 and the target volumes 111*a* and 111*b*. In step 132-4, it gets the local copy pair status in the Local Copy Pair Management Table 121 of the source storage subsystem 100*a*. In step 132-5, it changes the pair status of the target volume 111*a* and 111*b* pair to the same as the source volume 110*a* and 110*b* pair. In step 132-6, the program gets the local copy difference information (delta bitmap) in the Local Copy Delta Management Table 122 of the source storage subsystem 100*a*. In step 132-7, it combines the local copy difference information from the Local Copy Delta Management Tables 122 of the source storage subsystem 100*a* into that of the target storage subsystem100*b*. If both records are "Yes," the program stores "Yes." If both records are "No," the program stores "No." If one is "Yes" and the other is "No," the program stores "Yes." In step 132-8, if the delta information 131-2 of an address of a migration source primary volume 110*a* is "Yes," the program reads the data of the address from a migration source primary volume 110*a*, and copies the data to a migration target primary volume 111*a* and changes the delta information 131-2 of the address of the target primary volume 111*a* to "No." If the delta information 122-2 of an address of a pair stored in the target storage subsystem 100*b* is "No" or if the pair status is "PAIR" or "COPY", the program copies the data to a migration target secondary volume 111*b* and changes the delta information 131-2 of the address of the target secondary volume 111*b* to "No" also. In step 132-9, if the delta information 131-2 of an address of a migration source secondary volume 110*b* is "Yes," the program reads data of the address from a migration source secondary volume 110*b*, and copies the data to a migration target secondary volume 111*b* and changes the delta information 131-2 of the address of the target secondary volume 111*b* to "No." In step 132-10, the program releases the pair of migration source volumes 110*a* and 110*b* and deletes the migration source volumes 110*a* and 110*b*. In step 132-11, the program ends.

During step 132-5 and step 132-7, write I/O may occur onto the migration target volumes. However it can keep a record of the write I/O area on the Local Copy Delta Management Table 122 stored in a storage subsystem 100*b* by the method described in step 132-7.

To protect from data lost by some failure on migration process, the Migration Program 132 can replicate write I/O which a migration source volume receives to a migration target volume.

If a pair status is changed during migration, it stops the migration, resets the migration configuration, and restarts the migration.

Figure 7:
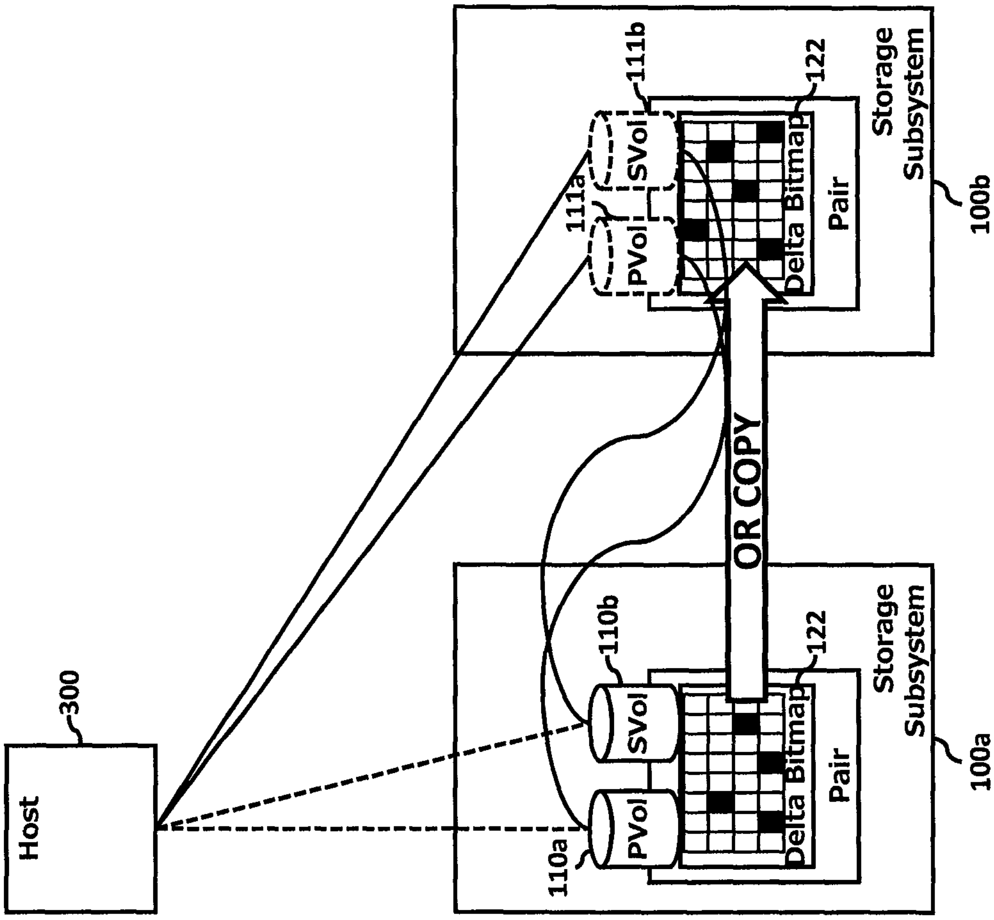
FIG. 7 shows the source storage subsystem and the target storage subsystem to illustrate an example of the migration process based on the Migration Progress Program as described above in connection with FIG. 6.

FIG. 7 shows the source storage subsystem 100*a* and the target storage subsystem 100*b* to illustrate an example of the migration process based on the Migration Progress Program 132 as described above in connection with FIG. 6.

Second Embodiment

Figure 8:
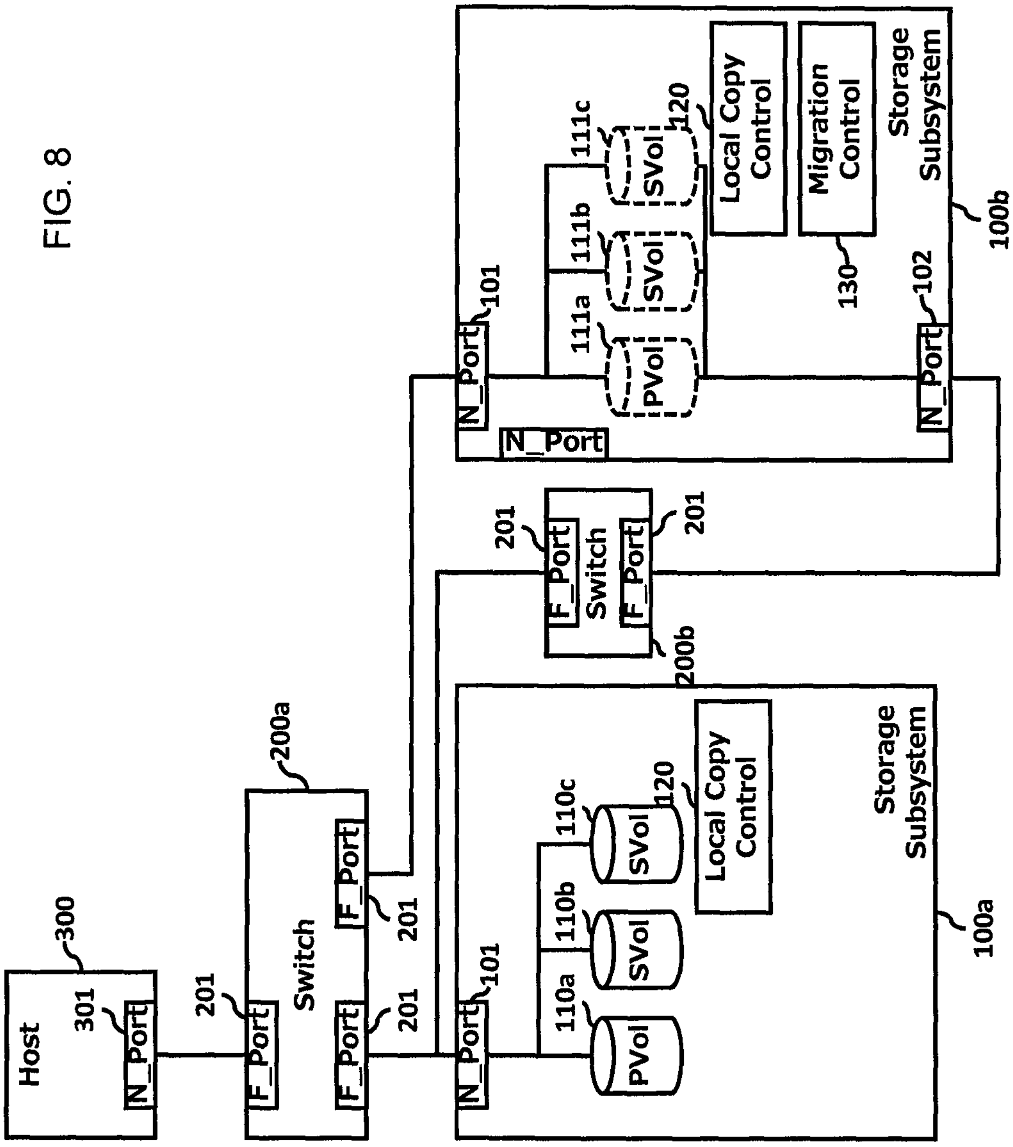
FIG. 8 illustrates an example of the physical and logical hardware configuration of a system in which the method and apparatus of the invention may be applied according to a second embodiment of the invention.

FIG. 8 illustrates an example of the physical and logical hardware configuration of a system in which the method and apparatus of the invention may be applied according to a second embodiment of the invention. Only differences from the first embodiment of FIG. 1 are described. The source storage subsystem 100*a* has a migration source volume 110*c*, and the target storage subsystem 100*b* has a migration target volume 111*c* for the migration source volume 110*c*.

Figure 9:
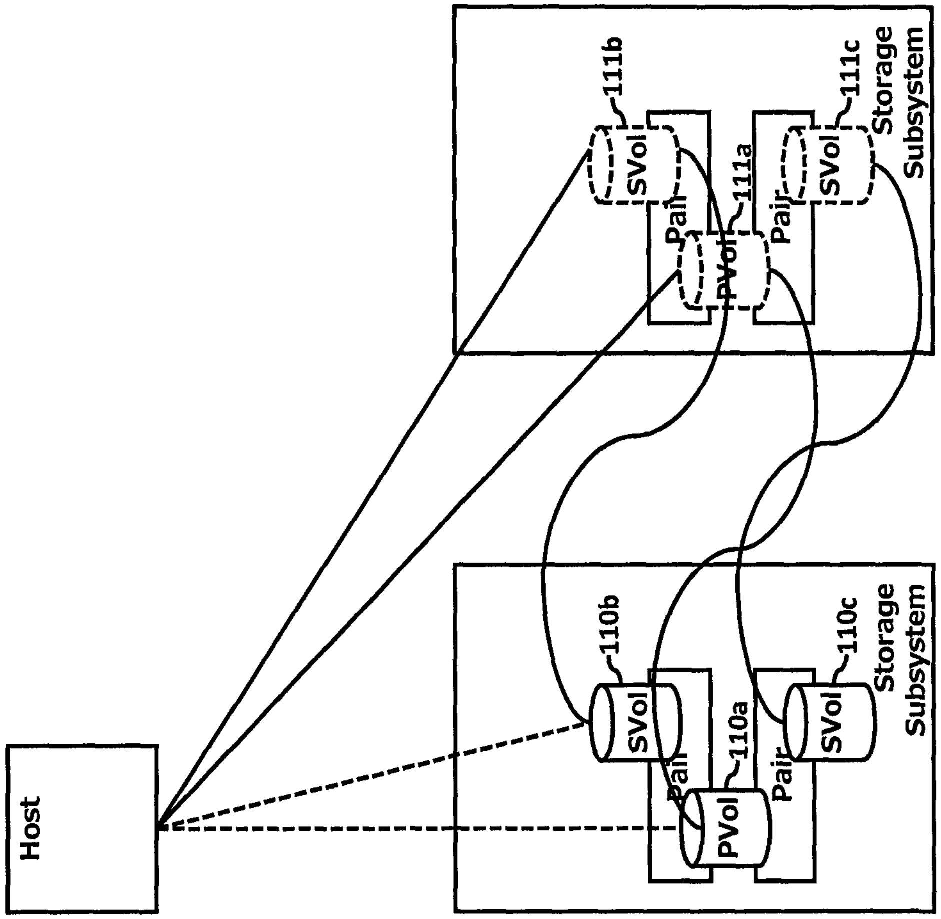
FIG. 9 illustrates an example of the logical hardware and local copy pair configuration of the system of FIG. 8 during migration according to the second embodiment of the invention.

FIG. 9 illustrates an example of the logical hardware and local copy pair configuration of the system of FIG. 8 during migration according to the second embodiment of the invention. The secondary volumes 110*b* and 110*c* share the same primary volume 110*a* in the source storage subsystem 100*a*. The primary volume 110*a* and secondary volume 110*b* establish a local copy pair, and the primary volume 110*a* and secondary volume 110*c* also establish a local copy pair.

Figure 10:
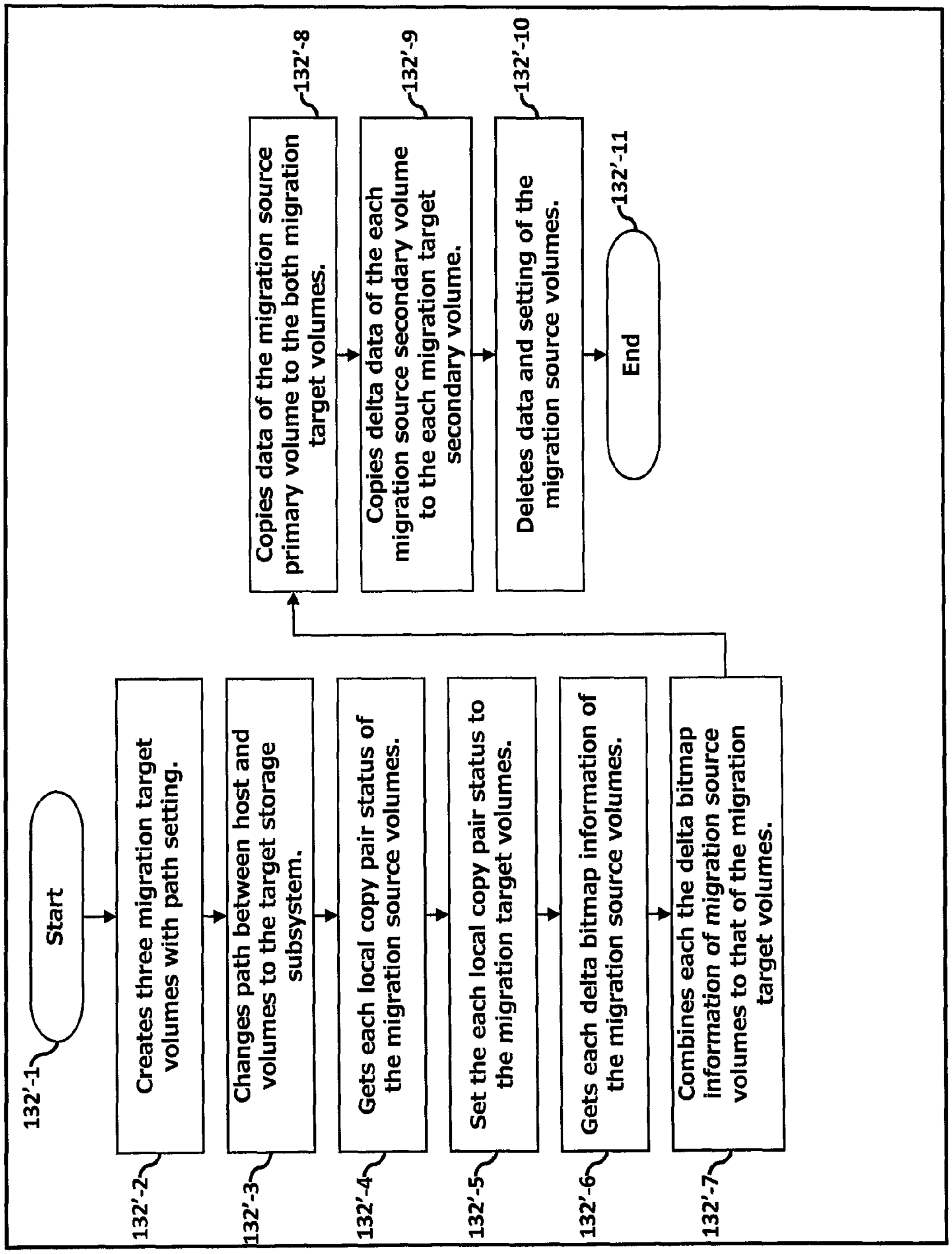
FIG. 10 is an example of a flow diagram illustrating the process of a Migration Progress Program according to the second embodiment of the invention.

FIG. 10 is an example of a flow diagram illustrating the process of a Migration Progress Program 132' according to the second embodiment of the invention. This Migration Progress Program 132' is included in the Migration Control 130 instead of Migration Progress Program 132 of first embodiment. It copies data from a source volume to a target volume which establish a local copy pair. The program starts at step 132'-1. In step 132'-2, it creates migration target volumes 111*a*, 111*b*, 111*c* with local copy pair establishments, and sets each pair status to "PSUS." In step 132'-3, it changes the path between the host computer 300 and the source volumes 110*a*,110*b*, 110*c* to the path between the host computer 300 and the target volumes 111*a*, 111*b*, 111*c*. In step 132'-4, it gets each local copy pair status in the Local Copy Pair Management Table 121 of the source storage subsystem 100*a*. In step 132'-5, it change each pair status of the target volumes 111*a* and 111*b* and the target volumes 111*a* and 111*c* pair to the same as that of the source volumes 110*a* and 110*b* pair and the source volumes 110*a* and 110*c* pair.

In step 132'-6, the program gets each piece of the local copy difference information in the Local Copy Delta Management Table 122 of the source storage subsystem 100*a*. In step 132'-7, it combines the local copy difference information from the Local Copy Delta Management Tables 122 of the source storage subsystem 100*a* into that of the target storage subsystem 100*b*. If both records are "Yes," the program stores "Yes." If both records are "No," the program stores "No." If one is "Yes" and the other is "No," the program stores "Yes." In step 132'-8, if the delta information 131-2 of an address of a migration source primary volume 110*a* is "Yes," the program reads data of the address from a migration source primary volume 110*a*, and copies the data to a migration target primary volume 111*a* and changes the delta information 131-2 of the address of the target primary volume 111*a* to "No." If the delta information 122-2 of an address of a pair stored in the target storage subsystem 100*b* is "No" or the pair status is "PAIR" or "COPY," the program copies the data to a migration target secondary volume 111*b* or 111*c* and changes the delta information 131-2 of the address of the copied target secondary volume to "No" also. In step 132'-9, if the delta information 131-2 of an address of a migration source secondary volume 110*b* is "Yes," the program reads data of the address from a migration source secondary volume 110*b*, and copies the data to a migration target secondary volume 111*b* and changes the delta information 131-2 of the address of the target secondary volume 111*b* to "No." This operation applies to the other source secondary volume 110*c* also. In step 132'-10, the program releases the pairs of volumes 110*a* and 110*b*, and 110*a* and 110*c*, and deletes the migration source volumes 110*a*, 110*b* and 110*c*. In step 132'-11, the program ends.

Third Embodiment

Figure 11:
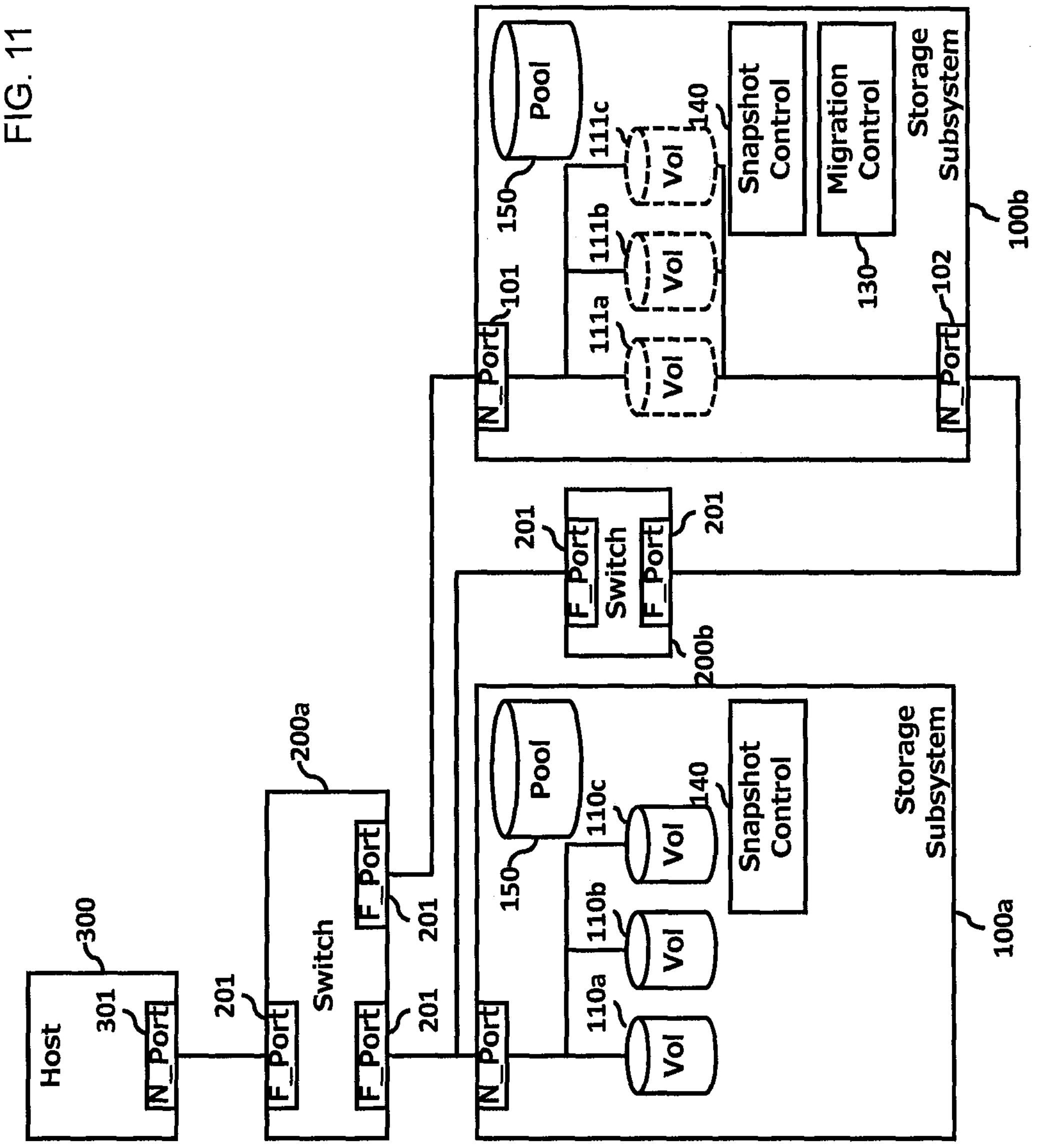
FIG. 11 illustrates an example of the physical and logical hardware configuration of a system in which the method and apparatus of the invention may be applied according to a third embodiment of the invention.

FIG. 11 illustrates an example of the physical and logical hardware configuration of a system in which the method and apparatus of the invention may be applied according to a third embodiment of the invention. Only differences from the second embodiment of FIG. 8 are described. Each storage subsystem 100*a*, 100*b* has a pool 150 to store the difference data. The difference data is the result of a previous data write I/O that occurs on a primary volume or a secondary volume and the data has not been synchronized between the primary volume and the secondary volume. In the second embodiment, a Snapshot Control 140 is stored in the memory of each storage subsystem instead of the Local Copy Control 120. The Snapshot Control 140 manages and controls logical snapshot. It needs a pair established by two volumes in a storage subsystem. One volume is a primary volume the other volume is a secondary volume. Generally it evacuates old data from the primary volume to the secondary volume when write I/O occurs on the primary volume and/or secondary volume. The start of the Snapshot Control process is ordered by a storage user. Two or more secondary volumes can share a same primary volume.

Figure 12:
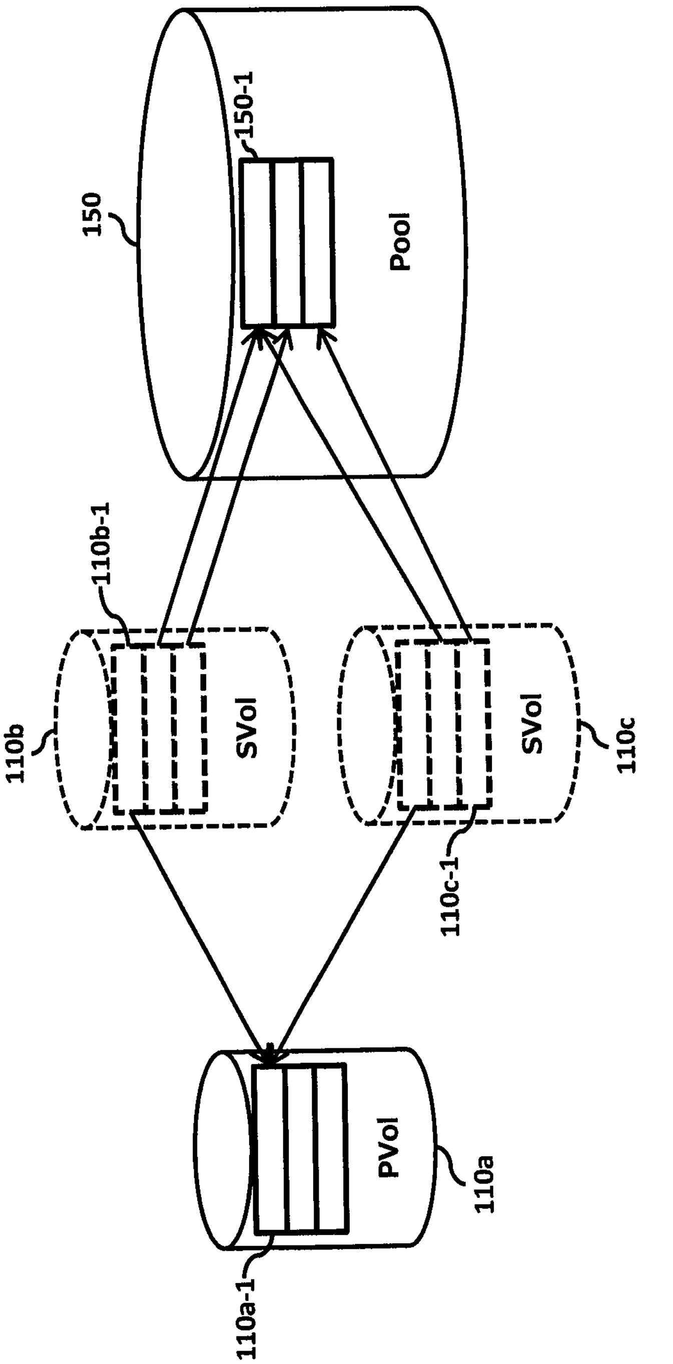
FIG. 12 illustrates an example of the primary volume, secondary volumes, and pool configuration of the system according to the third embodiment of the invention.

FIG. 12 illustrates an example of the primary volume, secondary volumes, and pool configuration of the system according to the third embodiment of the invention. The primary volume 110*a* is separated into a plurality of chunks 110*a*-1. The secondary volume 110*b* is separated into a plurality of chunks 110*b*-1. The secondary volume 110*c* is separated into a plurality of chunks 110*c*-1. The pool 150 is separated into a plurality of chunks 150-1. A secondary volume chunk 110*b*-1 or 110*c*-1 refers to a primary volume chunk 110*a*-1 or a pool chunk 150-1. Two or more secondary volume chunks can refer to the same pool chunk 150-1. When a read I/O occurs on a secondary volume, the system reads data of a primary volume chunk 110*a*-1 or a pool chunk 150-1 to which the secondary volume chunk 110*b* on the accessed area refers. When a write I/O occurs on a primary volume, it copies current data of the primary volume chunk 110*a*-1 onto a pool chunk 150-1 if one or more secondary volume chunks 110*b*-1 or 110*c*-1 refer to the primary volume chunk 110*a*-1, and changes the reference to the pool chunk 150-1. When a write I/O occurs on a secondary volume, it copies data of a pool chunk 150-1 onto another chunk 150-1 if one or more secondary volume chunks 110*b*-1 and 110*c*-1 refer the chunk 150-1, and change the reference to the other chunk 150-1.

FIG. 13 illustrates an example of a Snapshot Pair Management Table 141 according to the third embodiment of the invention. This table is used by and may be included in the Snapshot Control 140. It manages the pair configuration and status between volumes. The table is stored in a source storage subsystem 100*a* and can be used to manage a pair of source volumes 110*a* and 110*b*. The table is stored in a target storage subsystem 100*b* and can be used to manage a pair of target volumes 111*a* and 111*b*. The table has columns of Pair Number 141-1 as an ID of a pair, Status 141-2 showing the status of the pair, Primary Volume Number 141-3 as an ID of a primary volume of the pair, and Secondary Volume Number 141-4 as an ID of a secondary volume of the pair. The "PSUS" status means the primary and the secondary volumes are independent. During this status, the Snapshot Control 140 evacuates data of a secondary volume to a pool. The "COPY" status and "PAIR" status each mean the primary and the secondary volumes are synchronized. During either status, the Snapshot Control 140 forbids access to the secondary volume. The "SMPL" status means the pair is not established yet.

FIG. 14 illustrates an example of a Snapshot Primary Volume Delta Management Table 142 according to the third embodiment of the invention. This table is used by and may be included in the Snapshot Control 140. Each primary volume in the Snapshot Pair Management Table 141 has this table. It records the written area. This table has columns of Address 142-1 which is the address of a primary volume, and Delta Information 142-2. The initial record when the pair status changes to "PSUS" from other pair status is "No" on all addresses. When a primary volume receives a write I/O and evacuates data to the pool 150, the status changes to "Yes."

FIG. 15 illustrates an example of a Snapshot Secondary Volume Delta Management Table 143 according to the third embodiment of the invention. This table is used by and may be included in the Snapshot Control 140. Each secondary volume in the Snapshot Pair Management Table 141 has this table. It records the written area and address of evacuated data. This table has columns of Address 143-1 which is the address of a secondary volume, Delta Information 143-2, and Chunk Pointer or Stored Address 143-3. For the Delta Information 143-2, the initial record when the pair status changes to "PSUS" from other pair status is "No" on all addresses. When a primary volume or a secondary volume receives a write I/O and evacuates data to the pool 150, the status changes to "Yes." The Chunk pointer 143-3 is the address of the pool 150 which stores evacuated data.

FIG. 16 illustrates an example of a Snapshot Pool Management Table 144 according to the third embodiment of the invention. This table is used by and may be included in the Snapshot Control 140. A pool has this table. It manages free and allocated area in a pool and sharing status of the area by secondary volumes. This table has columns of Address 144-1 which is the address of a pool, Allocation Information 144-2, and Shared Information 144-3. For the Allocation Information 144-2, if the area is allocated to store secondary volume data, the record is "Yes." If the allocation is released, the record changes to "No." For the Shared Information 144-3, if two or more chunks of secondary volumes refer the area, the record is "Yes."

Figure 17:
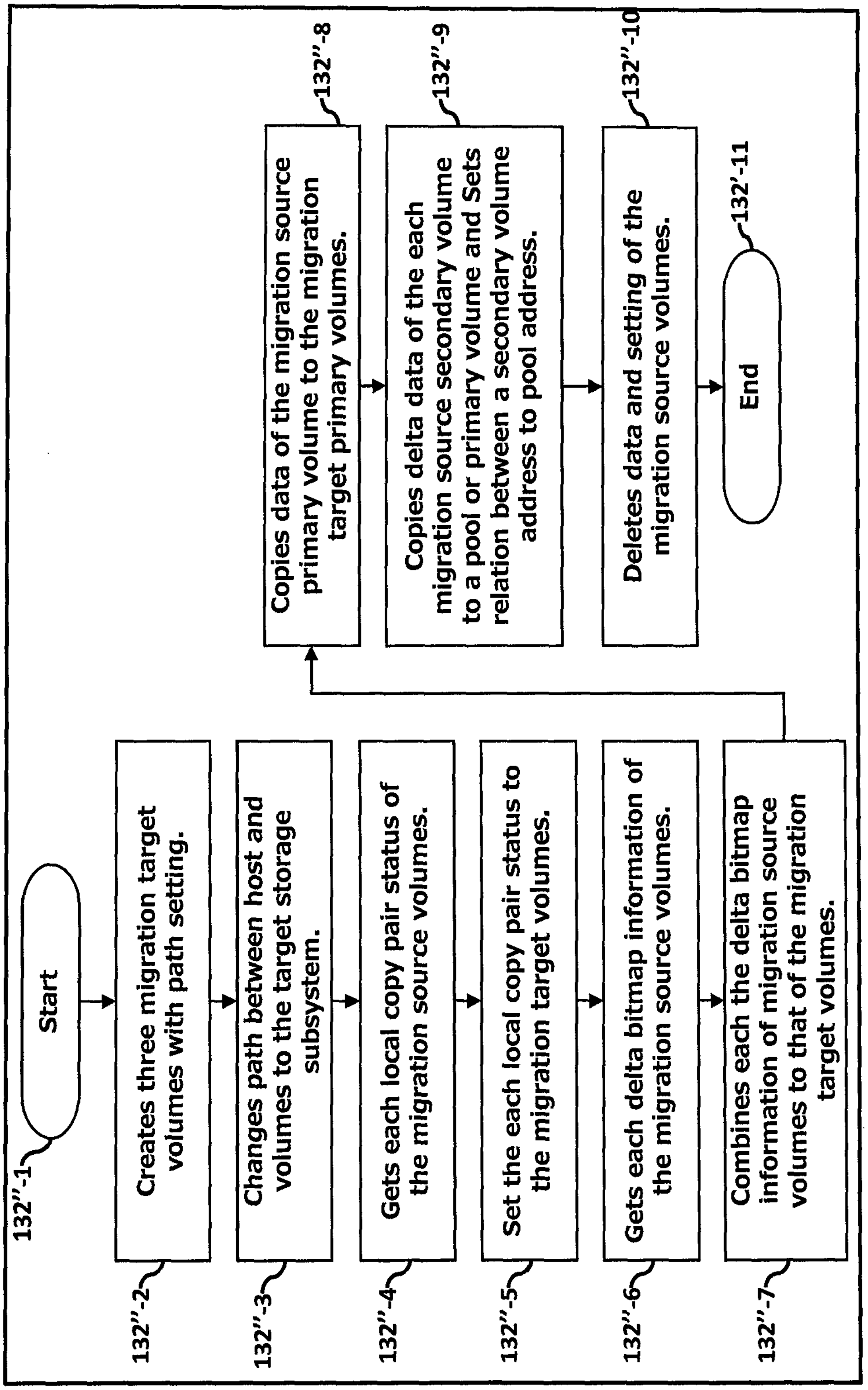
FIG. 17 is an example of a flow diagram illustrating the process of a Migration Progress Program according to the third embodiment of the invention.

FIG. 17 is an example of a flow diagram illustrating the process of a Migration Progress Program 132" according to the third embodiment of the invention. The program is included in the Migration Control 130 instead of the Migration Program 132' in the second embodiment. It copies data from a source volume to a target volume and a source pool to a target pool. The program starts at step 132"-1. In step 132"-2, the program creates migration target volumes 111*a*, 111*b* and 111*c* with local copy pair establishments, and sets each pair status as "PSUS." In step 132"-3, it changes the path between a host computer 300 and source volumes 110*a*, 110*b*, 110*c* to the path between the host computer 300 and target volumes 111*a*, 111*b*, 111*c*. In step 132"-4, it gets each local copy pair status in the Snapshot Pair Management Table 141 of the source storage subsystem 100*a*. In step 132"-5, the program changes each pair status of the target volumes 111*a* and 111*b* pair and the target volumes 111*a* and 111*c* pair to be the same as the pair status of the target volumes 110*a* and 110*b* pair and the target columes110*a* and 110*c* pair. In step 132"-6, the program gets Delta Information in the Snapshot Primary Volume Delta Management Table 142 and Snapshot Pool Management Table 144 of the source storage subsystem 100*a*.

In step 132"-7, the program combines the Delta Information from the Snapshot Primary Volume Delta Management Tables 142 of the source storage subsystem 100*a* into that of the target storage subsystem 100*b*. If both records are "Yes," the program stores "Yes." If both records are "No," it stores "No." If one is "Yes" and the other is "No," the program stores "Yes." In step 132"-8, if the delta information 142-2 of an address of a migration source primary volume 110*a* is "Yes," the program reads data of the address from a migration source primary volume 110*a*, and copies the data to a migration target primary volume 111*a* and changes the delta information 142-2 of the address of the target primary volume 111*a* to "No." In step 132"-9, if the delta information 143-2 of an address of a migration source secondary volume 110*b* is "Yes," the program reads data of the address from a migration source pool 150, and copies the data to a pool with allocation and changes the delta information 131¬ 2 of the address of the target secondary volume 111*b* to "No." If the area of a migration source pool 150 is shared with some other volume, it also changes the pointer of the Chunk Pointer 143-3 to the allocated area and changes the Delta Information 143-2 of the address of the target secondary volume 111*b* to "No." This operation applies to the other secondary volume 110*c* also. In step 132"-10, the program releases the pairs of source volumes 110*a* and 110*b* and source volumes 110*a* and 110*c*, and deletes the migration source volumes 110*a*, 110*b* and 110*c*. In step 132"-11, the program ends.

In specific embodiments such as the first and third embodiments described above, each storage subsystem has a local copy control 120 to manage and control the local copy pair, and a migration control 130 to control migration. In general, the migration from a source storage subsystem to a target storage subsystem may be controlled by the migration control 130 in the source storage subsystem or by the migration control 130 in the target storage subsystem, or even migration control 130 in both storage subsystems. When migration is controlled by only the migration control 130 in either the source or target storage subsystem, that migration control 130 in one storage subsystem may obtain local copy difference information from the other storage subsystem when it is needed. In a first example, migration in the first embodiment is controlled by the migration control 130 in the source storage subsystem 100*a*. In step 132-8 of FIG. 6, the program copies the migration data to the migration target secondary volume if the delta information 122-2 of an address of a pair stored in the target storage subsystem 100*b* is "No" or if the pair status is "PAIR" or "COPY." This local copy difference information of the target storage subsystem will need to be obtained by the migration control 130 of the source storage subsystem. In a second example, migration in the third embodiment is controlled by the migration control 130 in the target storage subsystem 100*b*. In step 132"-9 of FIG. 17, the program copies data from a migration source pool to a migration target pool if the delta information 143-2 of an address of a migration source secondary volume 110*b* is "Yes." This local copy difference information of the source storage subsystem will need to be obtained by the migration control 130 of the target storage subsystem.

Of course, the system configurations illustrated in FIGS. 1, 8, and 11 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for reducing traffic on data migration. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system comprising:

a plurality of storage systems which are operable to migrate a set of primary and secondary volumes between the plurality of storage systems by managing and copying, between the plurality of storage systems, a plurality of same data and a plurality of difference data between the primary and secondary volumes and location information of each of the plurality of difference data, the location information identifying a location of the difference data in the primary or secondary volume associated with the difference data;

wherein a source secondary volume, which corresponds to a source primary volume, if the source secondary volume contains data, has a same data as the source primary volume and, if the source secondary volume is not synchronized with the source primary volume, further has a difference data with respect to the source primary volume;

wherein the storage systems are operable to copy the same data from the source primary volume to a target primary volume and to replicate the same data to a target secondary volume corresponding to the target primary volume;

wherein the plurality of storage systems are operable to copy the difference data between the source primary volume and the source secondary volume to the target secondary volume; and wherein for migration from the source primary volume and the corresponding source secondary volume which establish a pair of source volumes in a source storage system to the target primary volume and the corresponding target secondary volume which establish a pair of target volumes in a target storage system, the plurality of storage systems are operable to:

manage local copy difference information between each primary volume and each corresponding secondary volume which establish a pair;

manage migration progress between each source volume and each corresponding target volume using a migration progress management table which shows, for an address of one or both of the volumes of each pair, a migration progress delta which is initially set to YES and is changed to NO when a copy for migration from source to target is finished on the address;

if the migration progress delta for the source primary volume is YES, copy data from the source primary volume to the target primary volume and change the migration progress delta of the address of the target primary volume to NO, and, if the local copy difference information indicates there is no difference data between the target primary volume and the target secondary volume, copy the data from the source primary volume to the target secondary volume and change the migration progress delta of the address of the target secondary volume to NO; and if the migration progress delta for the source secondary volume is YES, copy data from the source secondary volume to the target secondary volume and change the migration progress delta of the address of the target secondary volume to NO.

2. The system according to claim 1, wherein the difference data is copied from the source secondary volume to the target secondary volume and the same data is replicated from the target primary volume to the target secondary volume.

3. The system according to claim 2, wherein the source primary volume and the source secondary volume are disposed in a source storage system;

wherein the target primary volume and the target secondary volume are disposed in a target storage system; and wherein the plurality of storage systems are operable to copy the difference data from the source secondary volume to the target secondary volume, if data in the target secondary volume has not been updated in the target storage system since the difference data is stored in the source secondary volume.

4. The system according to claim 1, wherein the plurality of storage systems are operable to copy each difference data of the plurality of difference data from a source secondary volume for said each difference data to a corresponding target secondary volume.

5. The system according to claim 1, wherein the location information of each difference data of the plurality of difference data comprises a delta bitmap identifying the location of said each difference data in the primary or secondary volume associated with the difference data.

6. The system according to claim 5, wherein the source primary volume has a plurality of corresponding source secondary volumes to establish multiple pairs for the same source primary volume, each pair of the multiple pairs having a delta bitmap identifying the location of any difference data for said each pair; and wherein migrating the source primary volume and the plurality of corresponding source secondary volumes comprises copying same data for the source primary volume to the target primary volume and copying difference data for the plurality of corresponding source secondary volumes to a plurality of corresponding target secondary volumes, based on the delta bitmap of each pair of the multiple pairs.

7. A system comprising:

a plurality of storage systems which are operable to migrate a set of primary and secondary volumes between the plurality of storage systems by managing and copying, between the plurality of storage systems, a plurality of same data and a plurality of difference data between the primary and secondary volumes and location information of each of the plurality of difference data, the location information identifying a location of the difference data in the primary or secondary volume associated with the difference data;

wherein a source secondary volume, which corresponds to a source primary volume, if the source secondary volume contains data, has a same data as the source primary volume and, if the source secondary volume is not synchronized with the source primary volume, further has a difference data with respect to the source primary volume;

wherein the storage systems are operable to copy the same data from the source primary volume to a target primary volume and to replicate the same data to a target secondary volume corresponding to the target primary volume;

wherein the plurality of storage systems are operable to copy the difference data between the source primary volume and the source secondary volume to the target secondary volume;

wherein each storage system includes a pool for storing the difference data for the volumes in said each storage system;

wherein the location information for each difference data identifies the location of said each difference data in the pool;

wherein the location information for each difference data is associated with a secondary volume which has said each difference data with respect to a corresponding primary volume; and wherein the plurality of storage systems are configured, for migration from the source primary volume and the corresponding source secondary volume which establish a pair of source volumes in a source storage system to the target primary volume and the corresponding target secondary volume which establish a pair of target volumes in a target storage system, to:

manage local copy difference information between each primary volume and each corresponding secondary volume which establish a pair; and if the local copy difference information indicates there is difference data between the pair of source volumes, copy the difference data for the pair of source volumes from a pool in the source storage system to a pool in the target storage system using the location information associated with the source secondary volume of the pair of source volumes.

8. The system according to claim 7, wherein the source primary volume has a plurality of corresponding source secondary volumes to establish multiple pairs for the same source primary volume, each corresponding source secondary volume being associated with the location information for any difference data with respect to the source primary volume; and wherein the plurality of storage systems are configured, after the difference data is copied from the pool in the source storage system to the pool in the target storage system, to associate the location information for the difference data in the pool in the target storage system with each corresponding target secondary volume in the target storage system.

9. The system according to claim 7, wherein the difference data is copied from the source secondary volume to the target secondary volume and the same data is replicated from the target primary volume to the target secondary volume.

10. The system according to claim 9, wherein the source primary volume and the source secondary volume are disposed in a source storage system;

wherein the target primary volume and the target secondary volume are disposed in a target storage system; and wherein the plurality of storage systems are operable to copy the difference data from the source secondary volume to the target secondary volume, if data in the target secondary volume has not been updated in the target storage system since the difference data is stored in the source secondary volume.

11. The system according to claim 7, wherein the plurality of storage systems are operable to copy each difference data of the plurality of difference data from a source secondary volume for said each difference data to a corresponding target secondary volume.

12. The system according to claim 7, wherein the location information of each difference data of the plurality of difference data comprises a delta bitmap identifying the location of said each difference data in the primary or secondary volume associated with the difference data.

13. The system according to claim 12, wherein the source primary volume has a plurality of corresponding source secondary volumes to establish multiple pairs for the same source primary volume, each pair of the multiple pairs having a delta bitmap identifying the location of any difference data for said each pair; and wherein migrating the source primary volume and the plurality of corresponding source secondary volumes comprises copying same data for the source primary volume to the target primary volume and copying difference data for the plurality of corresponding source secondary volumes to a plurality of corresponding target secondary volumes, based on the delta bitmap of each pair of the multiple pairs.

14. A second storage system in a system of a plurality of storage systems, the second storage system comprising a processor; a memory; and a migration control module, the migration control module being configured to:

migrate a set of source primary and source secondary volumes from one or more source storage systems to the second storage system by managing and copying, between the one or more source storage systems to the second storage system, a plurality of same data and a plurality of difference data between the source primary and source secondary volumes and location information of each of the plurality of difference data, the location information identifying a location of the difference data in the source primary volume or source secondary volume associated with the difference data;

wherein a source secondary volume which corresponds to a source primary volume, if the source secondary volume contains data, has a same data as the source primary volume and, if the source secondary volume is not synchronized with the source primary volume, further has a difference data with respect to the source primary volume;

wherein the migration control module is configured to copy the same data from the source primary volume to a target primary volume and to replicate the same data from the target primary volume to a target secondary volume corresponding to the target primary volume;

wherein the migration control module is configured to copy the difference data between the source primary volume and the source secondary volume to the target secondary volume;

wherein the migration control module is configured to copy the same data from the source primary volume to the corresponding target primary volume and the corresponding target secondary volume in the second storage system; and wherein the migration control module is configured to copy the difference data from the source secondary volume to the corresponding target secondary volume in the second storage system.

15. The second storage system according to claim 14, wherein the location information of each difference data of the plurality of difference data comprises a delta bitmap identifying the location of said each difference data in the source primary or secondary volume associated with the difference data;

wherein the source primary volume has a plurality of corresponding source secondary volumes to establish multiple pairs for the same source primary volume, each pair of the multiple pairs having a delta bitmap identifying the location of any difference data for said each pair; and wherein migrating the source primary volume and the plurality of corresponding source secondary volumes comprises copying same data for the source primary volume to the target primary volume and copying difference data for the plurality of corresponding source secondary volumes to a plurality of corresponding target secondary volumes in the second storage subsystem, based on the delta bitmap of each pair of the multiple pairs.

16. A second storage system in a system of a plurality of storage systems, the second storage system comprising a processor; a memory; and a migration control module, the migration control module being configured to:

migrate a set of source primary and source secondary volumes from one or more source storage systems to the second storage system by managing and copying, between the one or more source storage systems to the second storage system, a plurality of same data and a plurality of difference data between the source primary and source secondary volumes and location information of each of the plurality of difference data, the location information identifying a location of the difference data in the source primary volume or source secondary volume associated with the difference data;

wherein a source secondary volume which corresponds to a source primary volume, if the source secondary volume contains data, has a same data as the source primary volume and, if the source secondary volume is not synchronized with the source primary volume, further has a difference data with respect to the source primary volume;

wherein the migration control module is configured to copy the same data from the source primary volume to a target primary volume and to replicate the same data from the target primary volume to a target secondary volume corresponding to the target primary volume;

wherein the migration control module is configured to copy the difference data between the source primary volume and the source secondary volume to the target secondary volume;

wherein for migration from the source primary volume and the corresponding source secondary volume which establish a pair of source volumes in the source storage system to the target primary volume and the corresponding target secondary volume which establish a pair of target volumes in the second storage system, the second storage system further comprises a local copy control module configured to manage local copy difference information between each target primary volume and each corresponding target secondary volume which establish a pair; and wherein the migration control module is configured to:

manage migration progress between each source volume and each corresponding target volume using a migration progress management table which shows, for an address of one or both of the source volumes of each pair, a migration progress delta which is initially set to YES and is changed to NO when a copy for migration from source to target is finished on the address;

if the migration progress delta for the source primary volume is YES, copy data from the source primary volume to the target primary volume and change the migration progress delta of the address of the target primary volume to NO, wherein, if the local copy difference information indicates there is no difference data between the target primary volume and the target secondary volume, the local copy control module is configured to copy the data from the target primary volume to the target secondary volume and change the migration progress delta of the address of the target secondary volume to NO; and if the migration progress delta for the source secondary volume is YES, copy data from the source secondary volume to the target secondary volume and change the migration progress delta of the address of the target secondary volume to NO.

17. The second storage system according to claim 16, wherein the location information of each difference data of the plurality of difference data comprises a delta bitmap identifying the location of said each difference data in the source primary or secondary volume associated with the difference data;

wherein the source primary volume has a plurality of corresponding source secondary volumes to establish multiple pairs for the same source primary volume, each pair of the multiple pairs having a delta bitmap identifying the location of any difference data for said each pair; and wherein migrating the source primary volume and the plurality of corresponding source secondary volumes comprises copying same data for the source primary volume to the target primary volume and copying difference data for the plurality of corresponding source secondary volumes to a plurality of corresponding target secondary volumes in the second storage subsystem, based on the delta bitmap of each pair of the multiple pairs.

18. A second storage system in a system of a plurality of storage systems, the second storage system comprising a processor; a memory; and a migration control module, the migration control module being configured to:

migrate a set of source primary and source secondary volumes from one or more source storage systems to the second storage system by managing and copying, between the one or more source storage systems to the second storage system, a plurality of same data and a plurality of difference data between the source primary and source secondary volumes and location information of each of the plurality of difference data, the location information identifying a location of the difference data in the source primary volume or source secondary volume associated with the difference data;

wherein a source secondary volume which corresponds to a source primary volume, if the source secondary volume contains data, has a same data as the source primary volume and, if the source secondary volume is not synchronized with the source primary volume, further has a difference data with respect to the source primary volume;

wherein the migration control module is configured to copy the same data from the source primary volume to a target primary volume and to replicate the same data from the target primary volume to a target secondary volume corresponding to the target primary volume;

wherein the migration control module is configured to copy the difference data between the source primary volume and the source secondary volume to the target secondary volume;

wherein each storage system includes a pool for storing the difference data for the volumes in said each storage system;

wherein the location information for each difference data identifies the location of said each difference data in the pool;

wherein the location information for each difference data is associated with a secondary volume which has said each difference data with respect to a corresponding primary volume; and wherein, for migration from the source primary volume and the corresponding source secondary volume which establish a pair of source volumes in the source storage system to the target primary volume and the corresponding target secondary volume which establish a pair of target volumes in the second storage system, the second storage system further comprises a local copy control module configured to manage local copy difference information between each target primary volume and each corresponding target secondary volume which establish a pair; and wherein the migration control module is configured to obtain from the source storage system local copy difference information between the source primary volume and the source secondary volume which establish the pair of source volumes, and, if the obtained local copy difference information indicates there is difference data between the pair of source volumes, copy the difference data for the pair of source volumes from a pool in the first storage system to a pool in a target storage system using the location information associated with the source secondary volume of the pair of source volumes.

19. The second storage system according to claim 18, wherein the location information of each difference data of the plurality of difference data comprises a delta bitmap identifying the location of said each difference data in the source primary or secondary volume associated with the difference data;

wherein the source primary volume has a plurality of corresponding source secondary volumes to establish multiple pairs for the same source primary volume, each pair of the multiple pairs having a delta bitmap identifying the location of any difference data for said each pair; and wherein migrating the source primary volume and the plurality of corresponding source secondary volumes comprises copying same data for the source primary volume to the target primary volume and copying difference data for the plurality of corresponding source secondary volumes to a plurality of corresponding target secondary volumes in the second storage subsystem, based on the delta bitmap of each pair of the multiple pairs.

* * * * *